United States Patent [19]

Nagaishi

[11] Patent Number: 5,067,466
[45] Date of Patent: Nov. 26, 1991

[54] SYSTEM FOR MEASURING AIR FLOW RATE FOR INTERNAL COMBUSTION ENGINES

[75] Inventor: Hatsuo Nagaishi, Kanawaga, Japan

[73] Assignee: Nissan Motor Company, Limited, Japan

[21] Appl. No.: 644,373

[22] Filed: Jan. 23, 1991

[30] Foreign Application Priority Data

Jan. 25, 1990 [JP] Japan .................................. 2-15784

[51] Int. Cl.⁵ .......................................... F02M 51/00
[52] U.S. Cl. .................................................. 123/494
[58] Field of Search ............... 123/494, 478; 73/118.2, 73/204.14, 204.16, 204.25, 861.02, 861.03; 364/431.07, 510

[56] References Cited

U.S. PATENT DOCUMENTS 4,887,577 12/1989 Arai et al. ........................ 123/494
4,889,101 12/1989 Schifford ........................... 123/494

FOREIGN PATENT DOCUMENTS 48-103924 12/1973 Japan ................................ 123/494
63-310440 12/1988 Japan ................................ 123/494

Primary Examiner—Raymond A. Nelli
Attorney, Agent, or Firm—Lowe, Price, LeBlanc & Becker

[57] ABSTRACT

A system for measuring a flow rate of intake air introduced into an internal combustion engine for an automotive vehicle, includes a hot-wire type air flow meter which comprises a sensor portion having a ceramic bobbin and a heating member wound onto the ceramic bobbin, and a control circuit for controlling current passing through the heating element so as to a hold temperature of the heating element constant. The hot-wire type air flow meter monitors the flow rate of the intake air to produce a sensor signal representative of the flow rate. The system also includes a control unit which receives the sensor signal to compensate a response time lag of the sensor signal, particularly when the engine operates in a transient state, such as acceleration and deceleration. The control unit derives a variation of the sensor signal value per a predetermined period of time to integrate the variation over a predetermined period of time to attenuate the integrated value, and corrects the sensor signal value on the basis of the attenuated value to use the result as a corrected value for air flow rate.

4 Claims, 10 Drawing Sheets

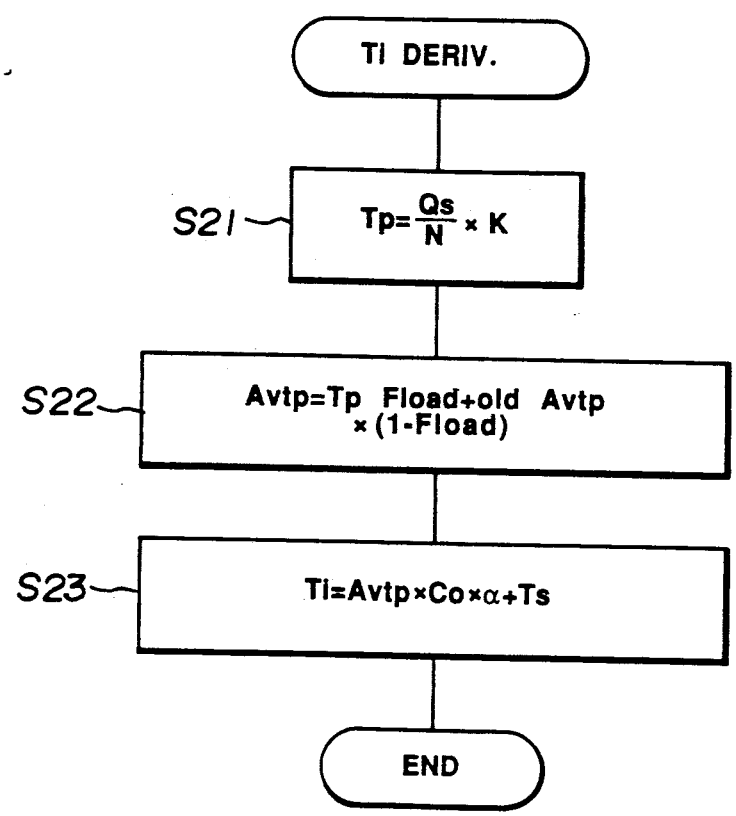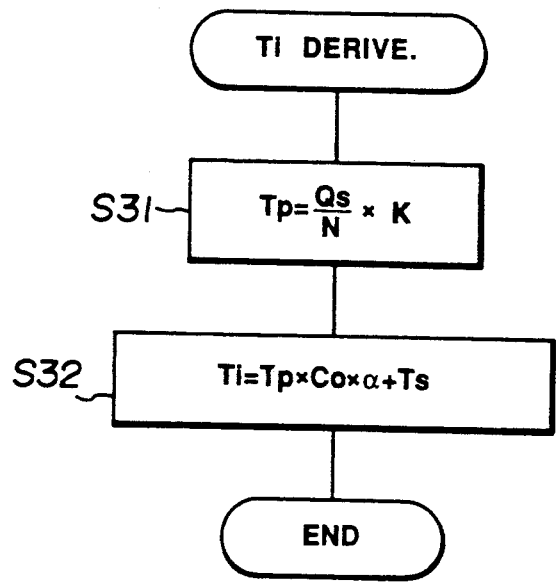

SYSTEM FOR MEASURING AIR FLOW RATE FOR INTERNAL COMBUSTION ENGINES

BACKGROUND OF THE INVENTION

1. Field of The Invention

The present invention relates generally to an air flow rate measuring system which uses a hot-wire type air flow meter for measuring flow rate of intake air introduced into an internal combustion engine or the like. More specifically, the invention relates to an air flow rate measuring system which can correct its response time lag when the engine operates in a transient state.

2. Description of The Background Art

As is well known, a so-called hot-wire type air flow meter has been widely used for controlling internal combustion engines. Such a hot-wire type air flow meter has a heating element made of platinum or nickel foil, and is designed to detect air flow rate by measuring heat dissipation caused by exposing the heating element to air flow within an intake pile. One hot-wire type air flow meter is disclosed in, for example, Japanese Patent First (unexamined) Publication (Tokkai Sho.) No. 48-103924.

In the aforementioned air flow meter, there is a disadvantage in that it is insufficiently responsive to variations of actual air flow rate, which causes response time lag when the engine operates in a transient state (when accelerated or decelerated).

In order to overcome the aforementioned problem, an improved air flow meter has been proposed in Japanese Patent Application (Tokugan Sho.) No. 63-310440. In this air flow meter, the response time lag caused in its output is presumed as a first-order lag of its approximate value, and the output value of the air flow meter is corrected by using variations of output value per a predetermined period of time.

Specifically, when abrupt variation of real air flow rate (instantaneous flow rate) Q occurs, the first-order lag of an output value $Q_{shw}$ of the air flow meter may be expressed by the following equation.

$$Q_{shw} = Q\{1 - \exp(-t/T)\} \quad (1)$$

in which t is an elapsed time from the abrupt variation, and T is a time constant of response.

Assuming that the output value $Q_{shw}$ of the air flow meter is sampled at every predetermined period of time, e.g. every 10 ms, as shown in FIG. 1, the aforementioned equation (1) can be approximated as follows, which shows a weighted mean of the output values $Q_{shw}$ of the equation (1).

$$Q_{shw} = Q \times K + \text{old}Q_{shw} \times (1 - K) \quad (2)$$

in which K is a weighted mean factor (a value less than or equal to 1), and the word "old" of the old $Q_{shw}$ means the preceding value (10 ms before). "Old" will hereinlater be used in this same manner.

From the equation (2), the real air flow rate Q may be expressed by the following equation.

$$Q = \text{old}Q_{shw} + (Q_{shw} - \text{old}Q_{shw}) \times (1/K) \quad (3)$$

Now, assuming that an air flow rate measured by an air flow rate measuring system is Qs and that (1/K) is a correction coefficient $A_{fmtc}$, an air flow rate in which any response time lags are corrected can be obtained by using an output value (old $Q_{shw}$) of the air flow meter and a variation $\Delta Q_{shw}$ ($=Q_{shw} - $ old $Q_{shw}$) per a predetermined period of time, in accordance with the following equation.

$$Qs = \text{old}Q_{shw} + \Delta Q_{shw} \times A_{fmtc} \quad (4)$$

By using this equation (4), it was found that an air flow meter has a superior responsiveness when the air flow meter has a thin platinum wire exposed to air flow.

However, platinum wires do not only have poor durability, but they are also very expensive. For that reason, in recent years, air flow meters often have a sensor portion which comprises either a heating element wound onto a ceramic bobbin as a coil or a film-shaped heating element mounted on a ceramic member.

When a hot-wire type air flow meter having a sensor portion of this type is applied to the aforementioned proposed system to measure air flow rate, it was found, by experiment, that there is a great divergence between the measured air flow rate and the actual air flow rate. FIGS. 2 and 3 show response waveforms, which are expressed in the drawings as corrected outputs, of the aforementioned proposed system when accelerated and decelerated, respectively. As shown in these drawings, divergences of the measured air flow rates from the real air flow rates become great immediately after leading edges (rising transition points) and trailing edges (falling transition points). In addition, when pulsation of intake air occurs in a full throttle state, variations of output value become greater than the pulsation of intake air.

For that reason, when the amount of fuel injected into an engine is derived in accordance with the corrected outputs as shown in the drawings, an air/fuel ratio of an air/fuel mixture introduced into the engine may deviate from the stoichiometric value so that drivability and exhaust gas purifying performance of the engine become bad.

SUMMARY OF THE INVENTION

It is therefore a principal object of the present invention to provide an improved air flow rate measuring system having a hot-wire type air flow meter, the sensor portion of which comprises a heating element wound onto a ceramic member.

It is another object of the present invention to improve responsiveness of the aforementioned air flow rate measuring system when a variation of air flow rate is abrupt.

In order to accomplish the aforementioned and other objects, an air flow rate measuring system has a hot-wire type air flow meter and a control unit. The air flow meter may monitor a flow rate of air passing through an air passage to produce a sensor signal representative of the air flow rate. The control unit may receive a sensor signal output from the air flow meter, to compensate a response time lag of the sensor signal, particularly when a variation of air flow rate is abrupt. The control unit may also derive a variation of the sensor signal value per a predetermined period of time to integrate the variation over a predetermined period of time to attenuate the integrated value, and correct the sensor signal value on the basis of the attenuated value to use the result as a corrected flow rate of the air. Alternatively, the control unit may derive a variation of the sensor signal value per a predetermined period of time to derive an intermediate corrected value of the sensor signal value on the basis of the variation of the sensor signal, and derive a variation of the intermediate corrected value of the sensor signal value to integrate the variation over a predetermined period of time to attenuate the integrated value, and finally correct the intermediate corrected value of the sensor signal value on the basis of the attenuated value to use the result as a corrected flow rate of the air.

According to one aspect of the present invention, a system for measuring a flow rate of air passing through an air passage, comprises: a hot-wire type air flow meter for monitoring a flow rate of air passing through an air passage to produce a sensor signal representative of the air flow rate, the air flow meter including a sensor portion which has a ceramic member and a heating element wound onto the ceramic member, and a control circuit for controlling current supplied to the heating element so as to hold temperature of the heating element constant; first means for receiving the sensor signal of the air flow meter to derive a variation of the sensor signal value per a first predetermined period of time to produce a first signal representative of the variation of the sensor signal value; second means for receiving the first signal to integrate the first signal value over a second predetermined period of time to attenuate the integrated value of the first signal value at a predetermined speed to produce a second signal representative of the attenuated value; and third means for receiving the sensor signal and the second signal to correct the sensor signal value of the air flow meter on the basis of the attenuated value to derive a corrected flow rate of air.

According to a further aspect of the present invention, there is provided a system for measuring a flow rate of air passing through an air passage, the system comprising: a hot-wire type air flow meter for monitoring a flow rate of air passing through an air passage to produce a sensor signal representative of the air flow rate, the air flow meter including a sensor portion which has a ceramic member and a heating element wound onto the ceramic member, and a control circuit for controlling current supplied to the heating element so as to hold a temperature of the heating element constant; first means for receiving the sensor signal of the air flow meter to derive a variation of the sensor signal value per a first predetermined period of time to produce a first signal representative of the variation of the sensor signal value; second means for receiving the sensor signal and the first signal to correct the sensor signal value on the basis of the variation of the sensor signal value to produce a second signal representative of an intermediate corrected value of the sensor signal value; third means for receiving the second signal to derive a variation of the second signal value per a second predetermined period of time to produce a third signal representative of the variation of the intermediate corrected value of the sensor signal value; fourth means for receiving the third signal to integrate the third signal value over a third predetermined period of time to attenuate the integrated value at a predetermined speed to produce a fourth signal representative of the attenuated value; and fifth means for receiving the second and fourth signals to correct the intermediate corrected value of the sensor signal value on the basis of the attenuated value to derive a corrected flow rate of air.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 11 is a flow chart of a program executed by the control system for deriving the fuel injection amount Ti in the case of a MPI system;

FIG. 12 is a flow chart of a program executed by the control system for deriving the fuel injection amount Ti in the case of a SPI system.

DESCRIPTION OF THE PREFERRED EMBODIMENT

Figure 4:
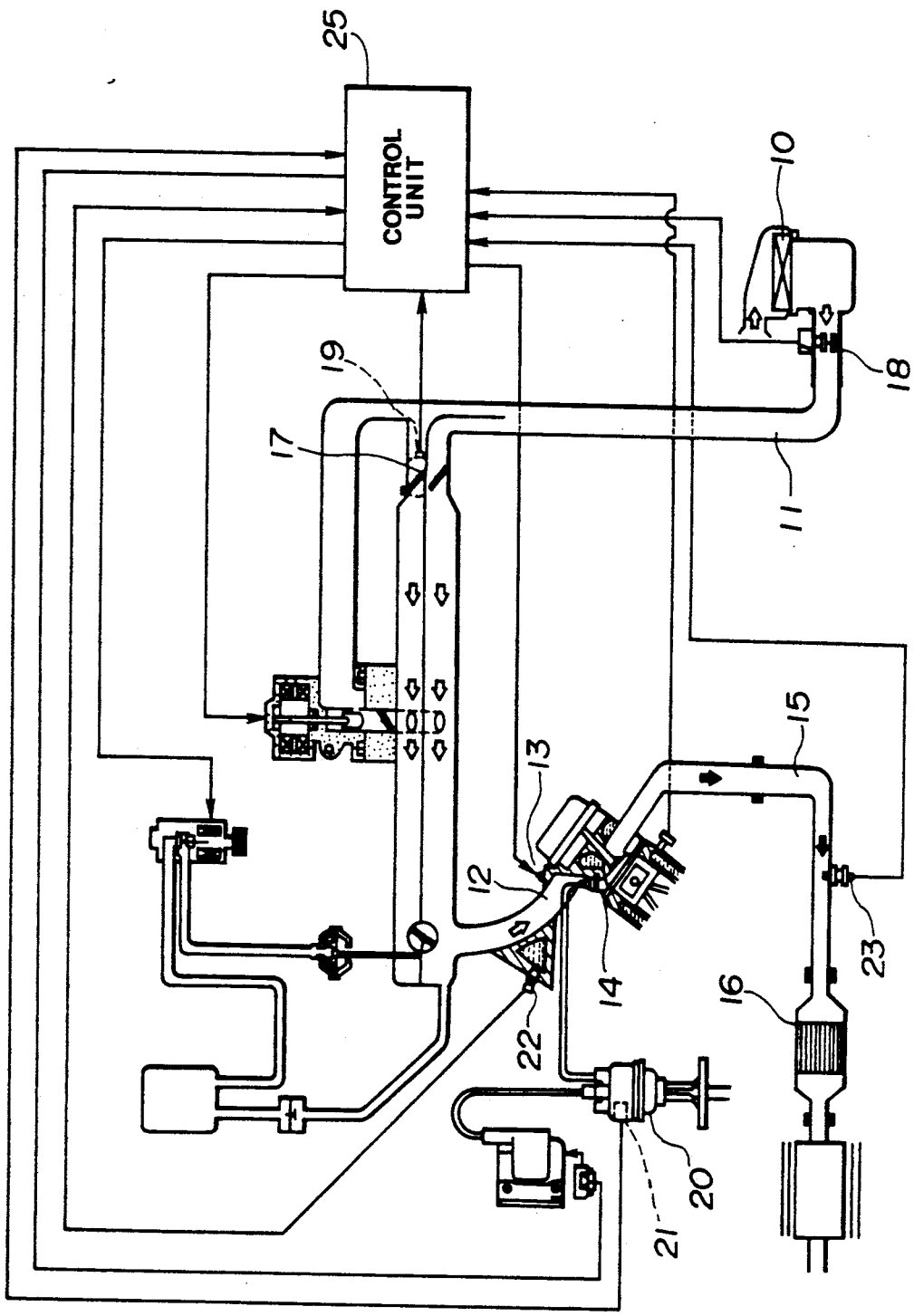
FIG. 4 is a schematic view of a fuel injection control system for injecting a controlled amount of fuel to an air induction system of an internal combustion engine, the preferred embodiments of an air flow rate measuring system, according to the present invention, can be applied to this fuel injection control system.

Referring now to the drawings, particularly to FIG. 4, there is schematically shown a fuel injection control system for injecting a controlled amount of fuel to an air induction system of an internal combustion engine. The preferred embodiments of an air flow rate measuring system, according to the present invention, can be applied to this fuel injection control system.

In this fuel injection control system, air is introduced into an intake duct 11 through an air cleaner 10, and fuel is injected from injectors 13 arranged at intake manifolds 12 of the respective cylinders. The air introduced into the intake duct 11 is introduced into the intake port 12 to be mixed with the injected fuel to form an air/fuel mixture which is introduced into the respective cylinders 14 of an internal combustion engine. The air/fuel mixture burns within the respective cylinders, and then, the combustion gas passes through an exhaust duct to be introduced into a catalytic converter 16 which purifies three harmful components (CO, HC, NOx).

A throttle valve 17 is housed within a throttle chamber arranged between the intake duct 11 and the intake ports 12. The throttle valve 17 is designed to open by applying an accelerator pedal (not shown) to cause increase of the flow rate of intake air introduced into the respective cylinders 14. An air flow meter 18, such as a hot-wire type air flow meter, is arranged upstream of the throttle valve 17. The hot-wire type air flow meter 18 monitors the flow rate of the intake air to output a voltage signal in accordance with the intake air flow rate. The output signal of the air flow meter 18 is input to a control unit 25 which derives the air flow rate Qs on the basis of arithmetic processing which will be described hereinlater.

Figure 1:
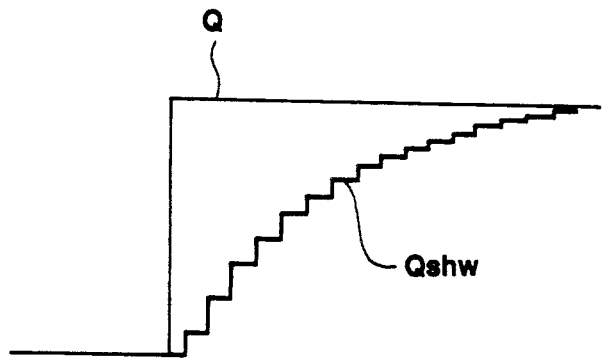
FIG. 1 is a graph showing a relationship between a real air flow rate Q and an output value $Q_{shw}$ of an air flow meter in the case of an air flow rate measuring system proposed in Japanese Patent Application (Tokugan Sho.) No. 63-310440.
Figure 2:
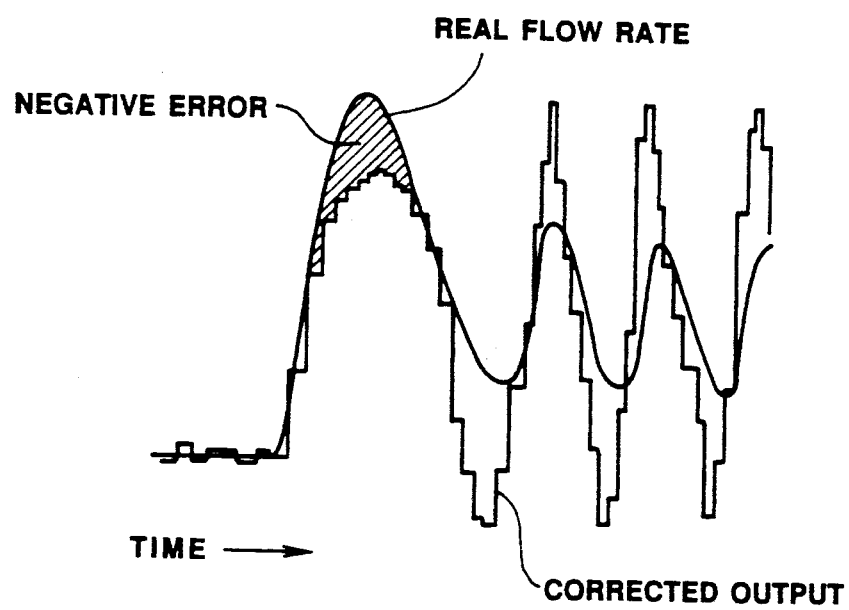
FIG. 2 is a graph showing response waveforms of the aforementioned proposed system when an engine operates in an acceleration state.
Figure 3:
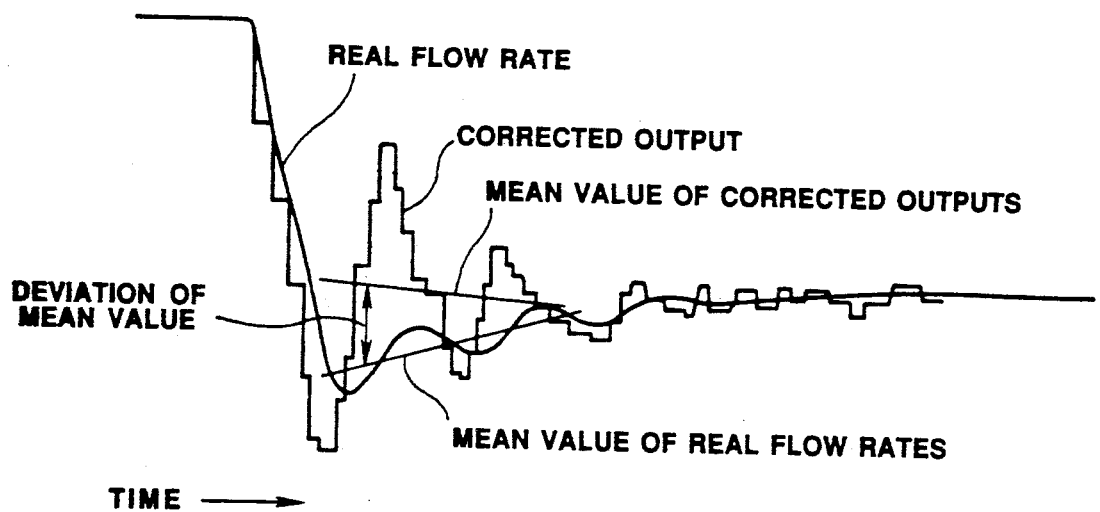
FIG. 3 is a graph showing response waveforms of the aforementioned proposed system when the engine operates in a deceleration state.
Figure 5:
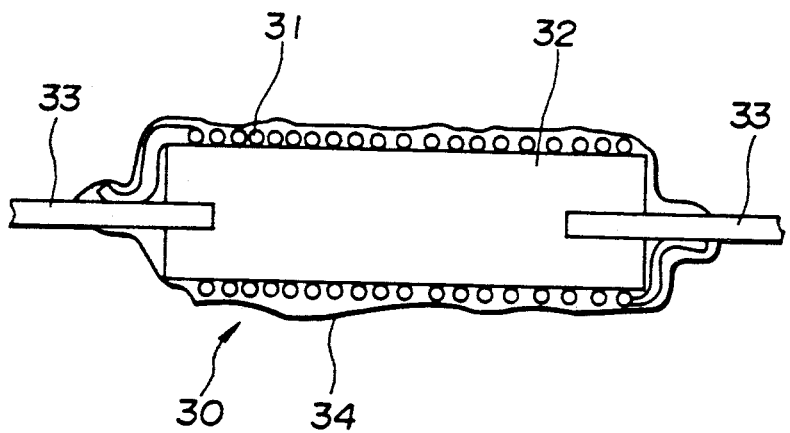
FIG. 5 is a schematic view of a sensor portion of the air flow meter of FIG. 4.

As shown in FIG. 5, the air flow meter 18 comprises a sensor portion 30 and a control circuit (not shown) mounted on a sensor housing. The sensor portion 30 has a ceramic bobbin 32 and a heating element (a hot-wire) 31 which is wound onto the ceramic bobbin 32 as a coil. The end portions of the hot-wire 31 are connected to electrodes 33, respectively. The sensor portion 30 is entirely coated with a glass coating 34.

On the other hand, the control circuit of the air flow meter 18 comprises a bridge arranged between the hot-wire 31 and the control unit 25. Since temperature of the hot-wire 31 decreases as the air flow rate increases, current passing through the hot-wire 31 must be increased as the flow rate increases in order to hold the temperature of the hot-wire 31 constant. This current value is converted into a voltage value to be output.

Again, referring to FIG. 4, the control unit 25 receives various sensor signals which are output from a throttle sensor 19, a crank angle sensor 21, an engine coolant temperature sensor 22 and an oxygen sensor 23. As is well known, the throttle sensor 19 is designed to detect an opening angle TVO of the throttle valve 17. The crank angle sensor 21 is disposed within a distributor 20 which rotates synchronously with engine revolution for monitoring an angular position of a crankshaft. The control unit 25 determines the amount of fuel injected from the injector 13 in accordance with the air flow rate derived from the output signal of the air flow meter 18. In addition, when the engine running condition becomes an air/fuel ratio feedback control region which does not include an engine starting condition and so forth, an air/fuel ratio feedback control is performed on the basis of the output of the oxygen sensor 23 so that the air/fuel ratio of the air/fuel mixture becomes within a narrow region, the center of which corresponds to the stoichiometric value of the air/fuel ratio. The control unit 25 comprises a microcomputer including CPU, ROM, RAM, I/O port and so forth and can perform various arithmetic processing.

Figure 6:
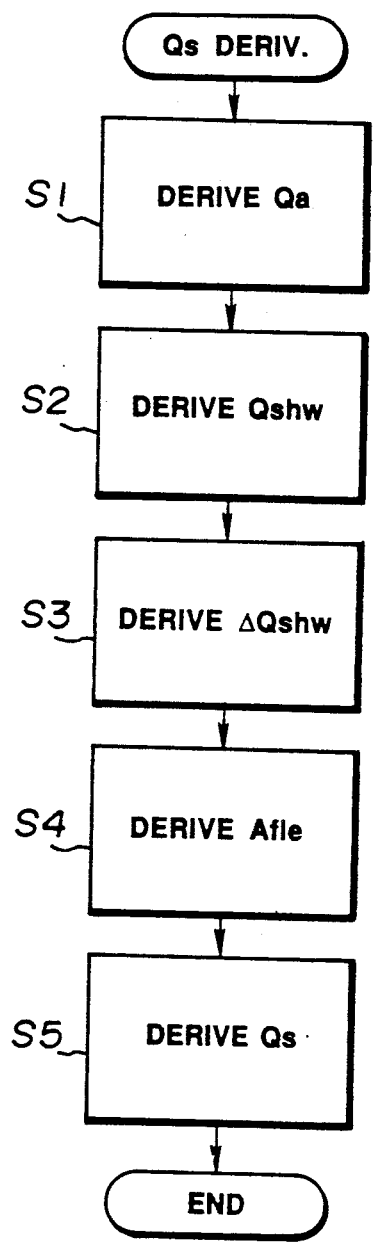
FIG. 6 is a flow chart of a program executed by a control unit of the first preferred embodiment of an air flow rate measuring system, according to the present invention, for deriving an intake air flow rate Qs.

FIG. 6 shows a flow chart of a program executed by the control unit 25 of the first preferred embodiment of an air flow rate measuring system according to the present invention, for deriving an intake air flow rate Qs. This program is executed at a predetermined time interval, e.g. every 4 ms.

At step 1, the output signal (AMF output) of the air flow meter 18 is converted from analog to digital. At step 2, the A/D converted value Qa is processed by so-called linearizing processing so as to be in proportion to the air flow rate. The linearized value is stored in a memory as $Q_{shw}$. These values are the result of preprocessings which have been previously stored. The value of $Q_{shw}$ will be hereinlater referred to as "air flow meter output".

When the engine operates at a steady state, the air flow meter output $Q_{shw}$ is nearly coincident with the real air flow rate Q. However, when the engine operates in a transient state (when accelerated or decelerated), it deviates from the real air flow rate Q due to construction of the sensor portion 30 shown in FIG. 5.

At step 3, a variation $\Delta Q_{shw}$ of the air flow meter output $Q_{shw}$ per a control cycle (per a predetermined period of time) is derived in accordance with the following equation.

$$\Delta Q_{shw} = Q_{shw} - \text{old } Q_{shw} \tag{5}$$

At step 4, a correction value $A_{fle}$ of the air flow meter output is derived from the variation $\Delta Q_{shw}$ derived at step 3, in accordance with the following equation.

$$A_{fle} = (\text{old } A_{fle} + \Delta Q_{shw} \times B/A) \times A_{fletc} \tag{6}$$

in which B/A is a constant, and $A_{fletc}$ is a coefficient (a value less than 1.0) corresponding to a time constant T2 of a time lag of a low frequency component which will be described hereinlater.

The meaning of the equation (6) becomes clear from the following equation in which the coefficient $A_{fletc}$ is removed.

$$A_{fle} = \text{old } A_{fle} + \Delta Q_{shw} \times B/A \tag{7}$$

In this equation, the total of the preceding value (old $A_{fle}$) and the current variation of the output ($\Delta Q_{shw} \times B/A$) is the current value ($A_{fle}$). Therefore, an integrated value of the variation at a every control cycle (at a every predetermined interval) is stored in the memory of $A_{fle}$. However, since the right side of the equation (6) corresponds to the right side of the equation (7) multiplied by the coefficient $A_{fletc}$, the integrated value of the variation becomes smaller than that of the equation (6) by a proportion determined by $A_{fletc}$ at an every control cycle. That is, the equation (6) shows the variation of $Q_{shw}$ which is integrated over a predetermined period of time to be attenuated at a predetermined speed.

Although the aforementioned coefficient $A_{fletc}$ may be a constant, it is preferably derived from the air flow meter output $Q_{shw}$ or an air flow rate Qs, which will be described hereinlater, so that the time constant T2 defining $A_{fletc}$ may depend upon the flow speed.

At step 5, an air flow rate Qs is derived from the correction value $A_{fle}$ and the air flow meter output $Q_{shw}$ in accordance with the following equation.

$$Qs = Q_{shw} + A_{fle} \times G_{afl} \tag{8}$$

in which $G_{afl}$ is a correction gain applied for complying a request for increasing $A_{fle}$, e.g. by 1.2 times, only under acceleration conditions. In this case, when decelerated, 1.0 is applied to $G_{afl}$.

The operation of the first preferred embodiment of an air flow rate measuring system, according to the present invention, is described below.

Figure 7:
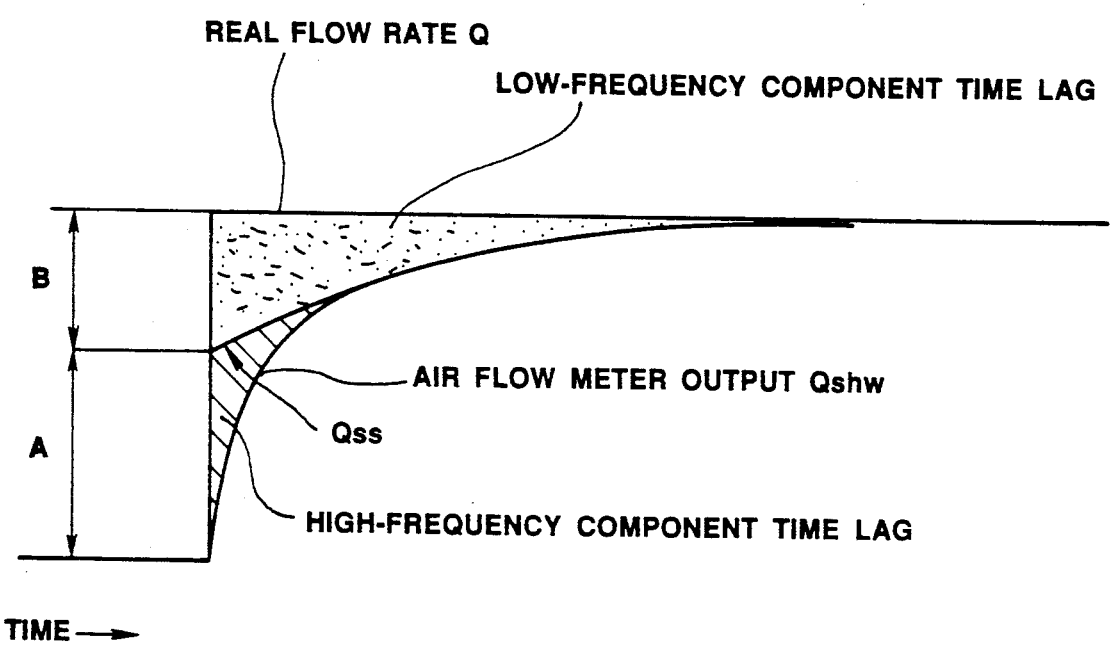
FIG. 7 is a graph of response time lag of the air flow meter of FIG. 4, the response time lag being assumed to be a time lag pattern in which two first-order lags are overlapped.

In this embodiment, the response time lag of the air flow meter 18 is assumed to be a time lag pattern shown in FIG. 7 (a time lag pattern in which two first-order lags are overlapped). Such a time lag pattern can be produced by bonding two low-pass filters in parallel. This can be expressed by the following formula.

$$Q_{shw} = Q\{1 - A \cdot \exp(-t/T1) - B \cdot \exp(-t/T2)\} \quad (9)$$

in which Q is a real air flow rate, t is an elapsed time, T1 is a time constant of a time lag of a high-frequency component and T2 is a time constant of a time lag of a low-frequency component. The time lags of the high and low frequency components will be hereinlater referred to as "high-frequency component time lag" and "low-frequency component time lag", respectively. The high-frequency component time lag is one of the first-order lags, which converges quickly relative to the other first-order lag, and the low-frequency component time lag is the other first-order lag which converges slowly.

In FIG. 7, A and B are inherent values depending upon construction of the sensor portion 30 of the air flow meter. These values vary in accordance with thickness and length of the hot-wire 31, heat capacity of the ceramic bobbin 32, thickness of the electrode 33 and so forth, and can be determined from these characteristics.

The reason why the response time lag of the sensor portion 30 of FIG. 5 becomes the combination of two first-order lags as shown in FIG. 7 is as follows. When the hot-wire 31 is held on the ceramic bobbin 32 as shown in FIG. 5 unlike a thin platinum wire exposed to the air flow, only one side of the hot-wire 31 comes into contact with the air flow and the other side thereof does not come into contact therewith. That is, it is presumed that the sensor portion 30 has two time constants. In this case, it is presumed that the temperature variation of the ceramic bobbin 32 relative to the air flow rate is slow since it has relatively great heat capacity, which causes increase of the response time lag, i.e. the low-frequency component time lag $B \cdot \exp(-t/T2)$ as shown in FIG. 7.

The program of FIG. 6 is used when the high-frequency component time lag $A \cdot \exp(-t/T1)$ is very small, that is, it is used for approximately deriving only the low-frequency component time lag $B \cdot \exp(-t/T2)$ by disregarding the high-frequency component time lag. Therefore, the equation (9) may be expressed by the following equation.

$$Q_{shw} = Q\{1 - B \cdot \exp(-t/T2)\} \quad (10)$$

Figure 8:
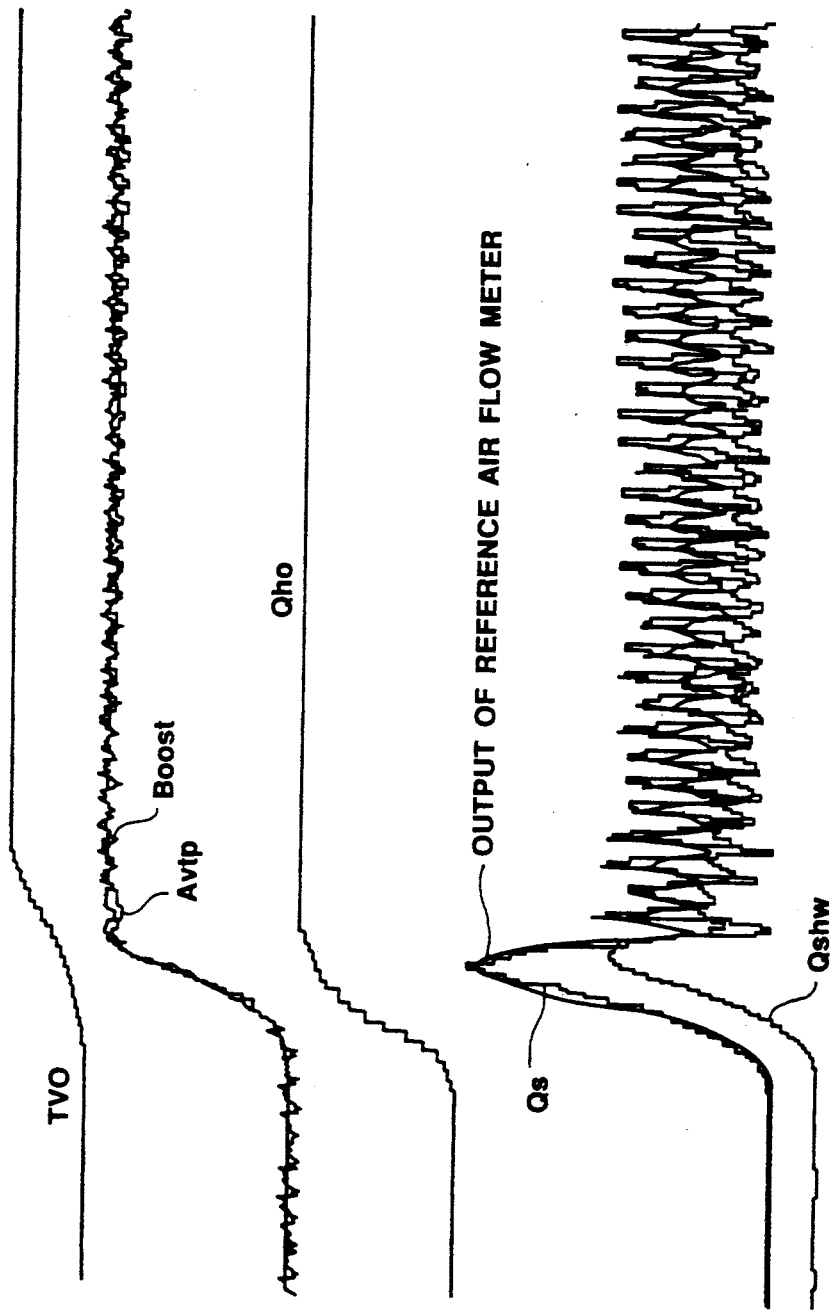
FIG. 8 is a graph showing a relationship between an air flow rate Qs derived by the air flow rate measuring system of FIG. 4 and an air flow rate measured by a reference air flow meter when the engine operates in an acceleration state.
Figure 9:
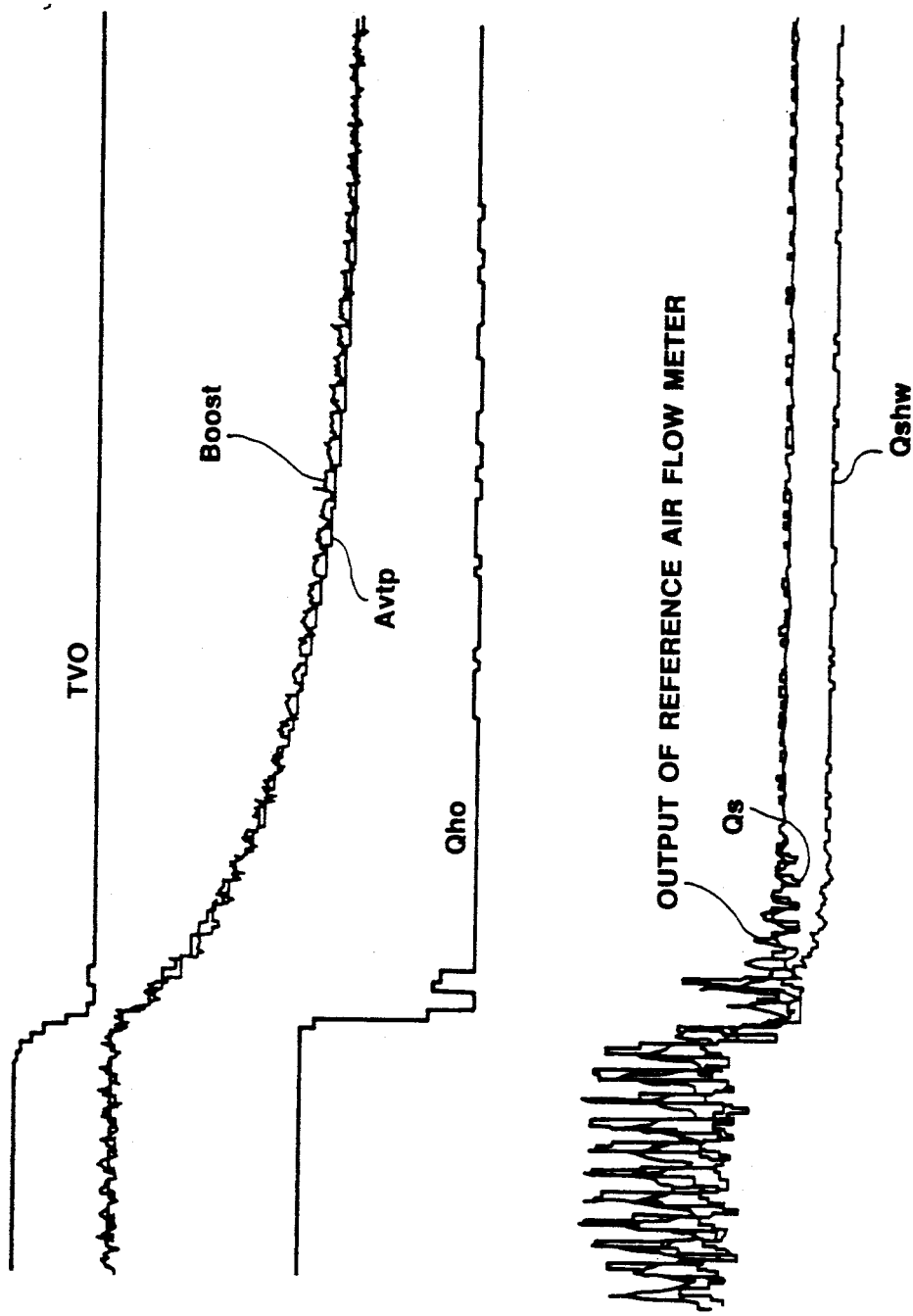
FIG. 9 is a graph showing a relationship between an air flow rate Qs derived by the air flow rate measuring system of FIG. 4 and an air flow rate measured by the reference air flow meter when the engine operates in an acceleration state.

In this way, when the air flow meter 18 has the sensor portion 30 of FIG. 5, the air flow rate Qs derived in accordance with the equation (8) can be substantially equal to the real air flow rate Q even if the engine operates in a transient state. FIGS. 8 and 9 show relationships between an air flow rate Qs derived by the first preferred embodiment of an air flow rate measuring system, according to the present invention, and an air flow rate measured by an reference air flow meter when accelerated and decelerated, respectively. From these drawings, it is found that the air flow rate Qs harmonizes with the measured air flow rate.

Furthermore, in FIGS. 8 and 9, $A_{vtp}$ denotes a fuel injection amount (a fuel injection pulse width). This $A_{vtp}$ is required for coinciding with a pressure Boost within an intake air pipe. As can be seen clearly from these drawings, it is found that $A_{vtp}$ harmonizes with the pressure Boost. In addition, $Q_{ho}$ denotes an air flow rate within the throttle valve when the engine operates in the steady state. The air flow rate $Q_{ho}$ is determined on the basis of the opening angle TVO of the throttle valve and the engine revolution speed N.

Figure 10:
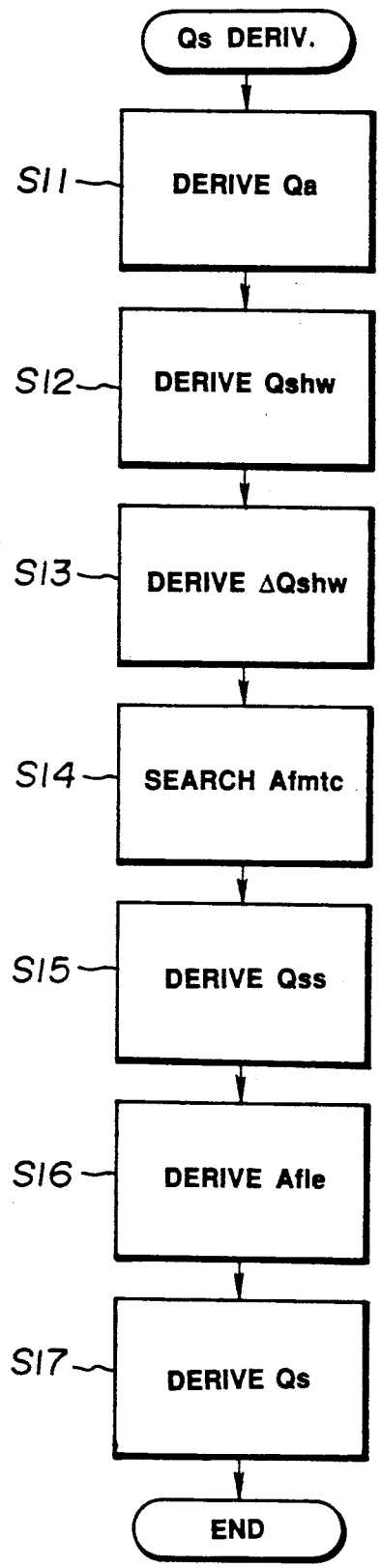
FIG. 10 is a flow chart of a program executed by a control unit of the second preferred embodiment of an air flow rate measuring system, according to the present invention.

FIG. 10 shows a flow chart of a program executed by the control unit 25 of the second preferred embodiment of an air flow rate measuring system according to the present invention, for deriving an intake air flow rate Qs. This program can be used when the high-frequency component time lag $A \cdot \exp(-t/T1)$ can not be disregarded. Therefore, this program is similar to that of the first preferred embodiment except for steps 14 and 15 for deriving the high-frequency component time lag.

At step 14, a coefficient $A_{fmtc}$ corresponding to the time constant T1 of the high-frequency component time lag is searched or looked up. Although $A_{fmtc}$ may be a constant, it is preferably derived from the air flow meter output $Q_{shw}$ or the air flow rate Qs.

At step 15, an intermediate flow rate Qss in which the high-frequency component time lag is considered, is derived in accordance with the following equation. Furthermore, the intermediate flow rate means an intermediate value for deriving the air flow rate Qs.

$$Qss = \text{old } Q_{shw} + \Delta Q_{shw} \times A_{fmtc} \quad (11)$$

This equation (11) is same as the equation (4) which is used for the aforementioned system proposed in Japanese Patent Application (Tokugan Sho.) No. 63-310440. The equation (11) is a correction equation of the air flow meter output $Q_{shw}$ when it is presumed that the air flow meter output $Q_{shw}$ responds to the real air flow rate Q as a first-order lag. In the case of the first-order lag, the air flow meter output $Q_{shw}$ can be corrected by sequentially adding a differential value multiplied by a coefficient, to the preceding air flow meter output old $Q_{shw}$. That is, in the aforementioned system (No. 63-310440) can be used in an air flow meter of a type in that a platinum wire is exposed to the air flow without being held on a ceramic bobbin.

Steps 16 and 17 correspond to steps 4 and 5 of the first preferred embodiment. At steps 16 and 17, in consideration with the low-frequency component time lag, the air flow rate Qs is finally derived in accordance with the following equations (12) and (13).

$$A_{fle} = (\text{old } A_{fle} + \Delta Qss \times B/A) \times A_{fletc} \quad (12)$$

$$Qs = Qss + A_{fle} \times G_{afl} \quad (13)$$

As the equations (12) and (13) are compared with the equations (7) and (8), there is clearly only one difference in that the intermediate flow rate Qss is substituted for the air flow meter output $Q_{shw}$. In the equation (12), $\Delta Qss$ (=Qss−old Qss) is a variation of Qss per a control cycle (per a predetermined period of time).

According to this embodiment, if a hot-wire type air flow meter having a heating element held on a ceramic bobbin, has a bad initial responsiveness, it is possible to decrease fluctuations of output of the air flow meter when the engine operates in a transient state.

In the case of a gasoline engine, the fuel injection amount (the fuel injection pulse width) Ti of the injector 13 and the spark ignition timing can be determined basically by using the air flow meter output $Q_{shw}$.

However, between a SPI system in which both of the air flow meter and the injectors are arranged at the substantially same position, e.g. at the branching portion of the intake manifold, and a MPI system in which the injectors 13 are arranged at the respective intake ports 12 of the respective cylinder as shown in FIG. 4, methods for determining the fuel injection amount Ti differ from each other as shown in FIGS. 11 and 12. Although the equations shown in FIGS. 11 and 12 are well known, the difference between the system of the present invention and the conventional systems is that Qs derived in the aforementioned embodiment is used as the air flow rate.

FIG. 11 shows a flow chart of a program for deriving the fuel injection amount Ti in the case of the MPI system.

At step 21, a basic fuel injection amount (a basis fuel injection pulse width) Tp (ms) is derived from the air flow rate Qs and the engine revolution speed N in accordance with the following equation.

$$Tp = (Qs/N) \times K \text{ (K: constant)} \tag{14}$$

At step 22, a fuel injection amount (a fuel injection pulse width) $A_{vtp}$ (ms) corresponding to the air flow rate at a location neighboring the injector is derived in accordance with the following equation.

$$A_{vtp} = Tp \times F_{load} + \text{old } A_{vtp} \times (1 - F_{load}) \tag{15}$$

in which $F_{load}$ is a weighted mean factor.

The reason why the equation (15) is required is that the air flow rate at the position of the air flow meter includes an overshoot component caused by variation of pressure within the manifold when the engine operates in the transient state, so that it is required for removing the overshoot component in order to derive the air flow rate at a location neighboring the cylinder. That is, by using the equation (15), abrupt variation of Tp can be made even.

At step 23, a final fuel injection amount Ti is derived in accordance with the following equation.

$$Ti = A_{vtp} \times Co \times a + Ts \tag{16}$$

in which Co is a total of 1 and various correction coefficients, a is an air/fuel ratio feedback correction coefficient derived on the basis of oxygen sensor output, and Ts is a correction coefficient for compensating battery voltage.

Figure 13:
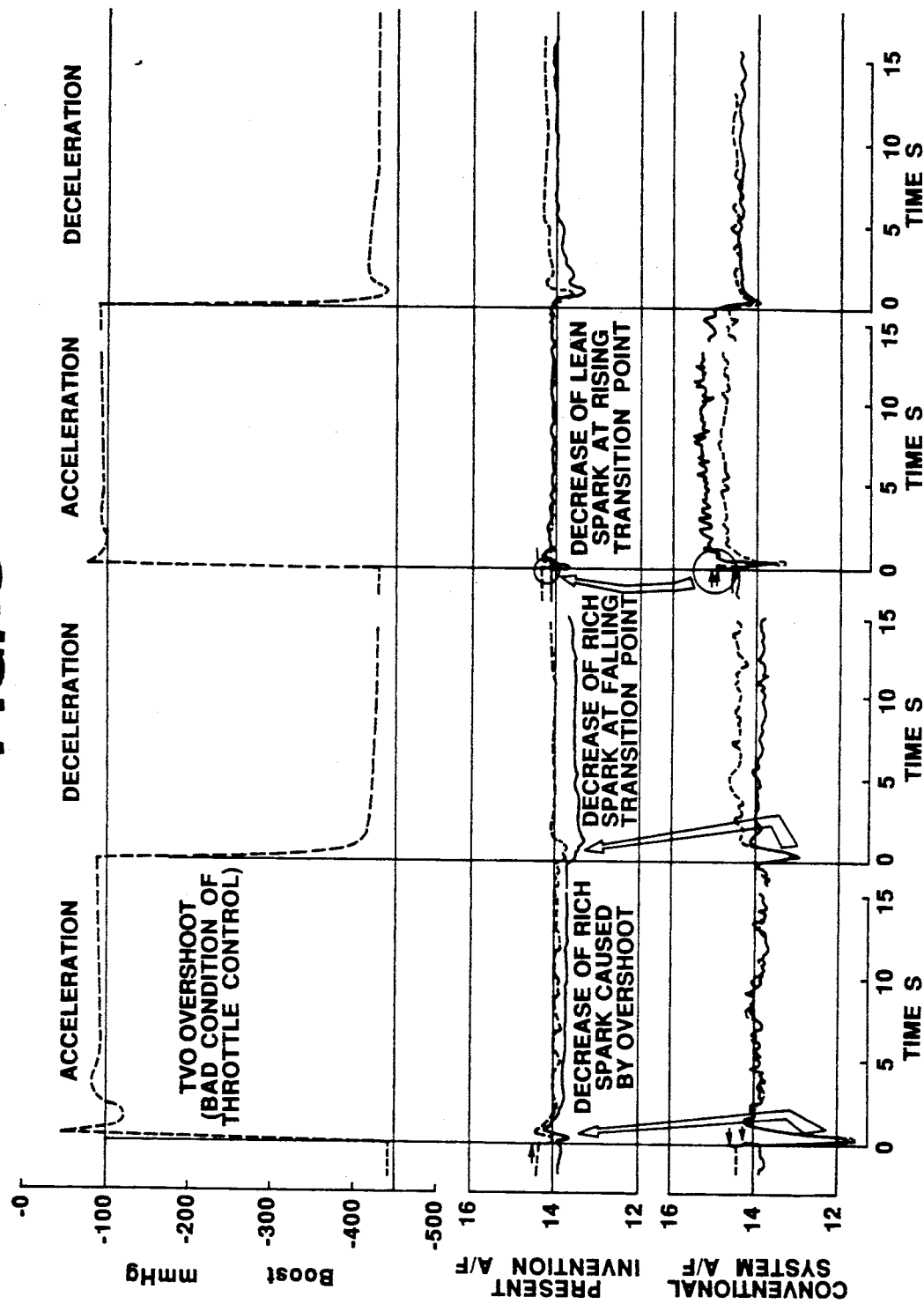
FIG. 13 is a graph showing waveforms of an air/fuel ratio when the engine operates in a transient state in a case where air/fuel ratio control is performed by using the control system of FIG. 11.

The middle row of FIG. 13 shows a waveform of air/fuel ratio when the engine operates in the transient state in a case where air/fuel ratio control is performed by using the control program of FIG. 11. In the left half of this drawing, the engine revolution speed for acceleration and deceleration is 1200 rpm, and in the right half of this drawing, the engine revolution speed for acceleration and deceleration is 2400 rpm. In addition, these waveforms were formed by overlapping waveforms measured at right and left banks of a V-type engine. The lower row of FIG. 13 shows waveforms of air/fuel ratio in conventional systems, and the upper row thereof shows variations of Boost.

As can be clearly from comparison with the lower row, response time lags at the falling transition point (when decelerated) and at the rising transition point (when accelerated) can be greatly improved. As a result, it is possible to decrease a rich spark caused by the response time lag at the falling transition point and a lean spark caused by the response time lag at the rising transition point.

In addition, if a bad condition of the throttle valve control causes overshoot in variations of Boost, the overshoot can be removed in accordance with the aforementioned equation (15) so that the air/fuel ratio does not vary due to the overshoot, thereby overly rich spark due to overshoot can be decreased.

In the shown embodiments of an air flow rate measuring system, according to the present invention, a discrete-valued control is used since the microcomputer performs digital control. However, continuous-valued control can be also used in an air flow rate measuring system, according to the present invention.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for measuring a flow rate of air passing through an air passage, said system comprising:
   a hot-wire type air flow meter for monitoring a flow rate of air passing through an air passage to produce a sensor signal representative of the air flow rate, said air flow meter including a sensor portion which has a ceramic member and a heating element wound onto the ceramic member, and a control circuit for controlling current supplied to the heating element so as to hold temperature of the heating element constant;
   first means for receiving said sensor signal of the air flow meter to derive a variation of said sensor signal value per a first predetermined period of time to produce a first signal representative of the variation of the sensor signal value;
   second means for receiving said first signal to integrate said first signal value over a second predetermined period of time to attenuate the integrated value of the first signal value at a predetermined speed to produce a second signal representative of the attenuated value; and
   third means for receiving said sensor signal and said second signal to correct said sensor signal value of the air flow meter on the basis of the attenuated value to derive a corrected flow rate of air.

2. A system as set forth in claim 1, wherein said system is applied to an fuel injection control system of an internal combustion engine for an automotive vehicle, and said hot-wire type air flow meter monitors a flow rate of intake air introduced into the internal combustion engine.

3. A system for measuring a flow rate of air passing through an air passage, said system comprising:

a hot-wire type air flow meter for monitoring a flow rate of air passing through an air passage to produce a sensor signal representative of the air flow rate, said air flow meter including a sensor portion which has a ceramic member and a heating element wound onto the ceramic member, and a control circuit for controlling current supplied to the heating element so as to hold a temperature of the heating element constant;

first means for receiving said sensor signal of the air flow meter to derive a variation of said sensor signal value per a first predetermined period of time to produce a first signal representative of the variation of the sensor signal value;

second means for receiving said sensor signal and said first signal to correct the sensor signal value on the basis of the variation of the sensor signal value to produce a second signal representative of an intermediate corrected value of the sensor signal value;

third means for receiving said second signal to derive a variation of said second signal value per a second predetermined period of time to produce a third signal representative of the variation of said intermediate corrected value of the sensor signal value;

fourth means for receiving said third signal to integrate said third signal value over a third predetermined period of time to attenuate the integrated value at a predetermined speed to produce a fourth signal representative of the attenuated value; and fifth means for receiving said second and fourth signals to correct said intermediate corrected value of the sensor signal value on the basis of the attenuated value to derive a corrected flow rate of air.

4. A system as set forth in claim 3, wherein said system is applied to an fuel injection control system of an internal combustion engine for an automotive vehicle, and said hot-wire type air flow meter monitors a flow rate of intake air introduced into the internal combustion engine.

* * * * *